United States Patent [19]
Janikowski et al.

[11] Patent Number: 4,485,153
[45] Date of Patent: Nov. 27, 1984

[54] CONDUCTIVE PIGMENT-COATED SURFACES

[75] Inventors: Daniel S. Janikowski, Lake Geneva, Wis.; Steven A. Bradley, Northbrook, Ill.

[73] Assignee: UOP Inc., Des Plaines, Ill.

[21] Appl. No.: 605,452

[22] Filed: Apr. 30, 1984

Related U.S. Application Data

[63] Continuation-in-part of Ser. No. 449,968, Dec. 15, 1982.

[51] Int. Cl.³ ............................................... B06D 3/02
[52] U.S. Cl. .................................... 428/688; 106/1.18; 106/1.19; 106/1.26; 420/456; 420/469
[58] Field of Search ................. 427/37, 229; 428/688, 428/450, 469; 106/1.18, 1.19, 1.21, 1.26, 1.28; 420/456, 469, 528, 539

[56] References Cited

U.S. PATENT DOCUMENTS

| | | | |
|---|---|---|---|
| 2,175,606 | 10/1939 | Kinkead | 427/37 |
| 3,031,568 | 4/1962 | Turner | 420/469 X |
| 3,181,981 | 5/1965 | Benny et al. | 420/469 |
| 3,391,010 | 7/1968 | Hauel | 106/1.26 |
| 3,438,770 | 4/1969 | Clark et al. | 420/456 |
| 3,671,291 | 6/1972 | Miller et al. | 106/1.26 |
| 3,843,350 | 10/1974 | Larey | 428/450 X |
| 3,872,360 | 3/1975 | Sheard | 106/1.18 X |
| 3,898,352 | 8/1975 | Flowers | 106/1.26 X |
| 4,081,710 | 3/1978 | Heywood et al. | 420/456 |
| 4,418,099 | 11/1983 | Cueras et al. | 106/1.26 |

Primary Examiner—George F. Lesmes
Assistant Examiner—Nancy A. B. Swisher
Attorney, Agent, or Firm—William H. Page, II; Raymond H. Nelson

[57] ABSTRACT

Conductive thick film pigment-coated surfaces which possess desirable conductivity and solderability characteristics are formed from an alloy comprising a mixture of a nonnoble conductive metal, a noble metal and at least one oxidizable material. The oxidizable material is present in the alloy in an amount in the range of from about 5% to about 25% by weight, the nonnoble metal in an amount in the range of from about 94% to about 60% by weight and the noble metal in an amount in the range of from about 1% to about 15% by weight of the alloy. The desired product is prepared by admixing a nonnoble metal, an oxidizable material and a noble metal, arc-melting the mixture to form an alloy, grinding the arc-melted alloy to a powdered form, admixing the powder with the carrier binder, depositing said admixture on an inert surface, firing the admixture and surface in an oxygen-containing atmosphere at a temperature in the range of from about 500° to about 950° C. and fluxing the resultant conductive thick film pigment-coated surface with a zinc-chloride based flux to provide the desired product.

9 Claims, No Drawings

CONDUCTIVE PIGMENT-COATED SURFACES

CROSS-REFERENCE TO RELATED APPLICATION

This application is a continuation-in-part of our copending application Ser. No. 449,968 filed Dec. 15, 1982, all teachings of which are incorporated herein by reference thereto.

BACKGROUND OF THE INVENTION

The use of thick-film resistors, capacitors, etc. parts in microcircuits is becoming of increasing importance in the electrical and electronic field. These thick-film components which comprise a layer of ink or paste which may be conductive, partially conductive, semiconductive or nonconductive in nature are deposited on a ceramic substrate by a process which is similar in nature to the silk-screening method whereby a pattern of films is laid down to form conductors, dielectrics, resistors, capacitors or semiconductors. Following the deposition of the film on the substrate, the resulting material is then fired to a temperature usually ranging from about 500° to about 1000° C. or more in air whereby the film is firmly affixed to the substrate. The resultant paste or ink substrate combination can form a microcircuit of passive components and, in addition, if so desired, discrete active components such as transistors or integrated circuit chips can be attached separately to form a thick-film hybrid device.

As hereinbefore set forth, the use of thick-film items or products is becoming more important due to the advantages which these items offer over other technology such as discrete parts, printed circuits, thin films, etc. For example, the designs which are used which have thick-film networks are easy, quick and flexible with low development costs and offer the design freedom and variety of parameter values which are normally available with discrete paerts. Furthermore, circuits formed from thick films can combine many types of components such as high value capacitors, resistors, etc. which are not possible with monolithic products. In addition, the method of preparation of thick-film devices is simple inasmuch as the screen printing and heating processes are easy to control and automate. This is in contradistinction to thin-film networks which require a great degree of care in the sputtering and evaporating processes. The operation advantages which are possible when utilizing thick-film devices include high reliability which results from the use of fewer interconnection points. Furthermore, in contrast with discrete parts, the thick-film devices have improved resistance-matching and temperature-tracking capabilities.

All of the above-enumerated advantages will permit the use of thick-film devices in consumer radio and television products as well as in computers and in industrial electronic devices. These thick-film devices such as resistor networks may be used to replace the carbon resistor while hybrid modules including a thick-film device may be used in television circuits for the horizontal and vertical oscillators, high-voltage dividers and chroma signal processors. Additional uses for these devices are found in telephones, two-way radios, multiplexers, insulators, voltage regulators and heating aids. Likewise, these devices may also be used in industrial control systems such as analog-to-digital and digital-to-analog converters, operation amplifiers, servo amplifiers, power amplifiers and power supply regulators, while in the automotive field hybrid thick-film devices may be used in fuel injection systems. It is thus readily apparent that thick-film devices find a wide variety of uses in many fields.

The silk-screen conductor pastes which are currently in use are produced by combining a noble metal pigment such as gold, silver, platinum, palladium, etc. with a powder glass mixture, an organic vehicle and an organic binder. Thereafter, the paste is silk-screened onto a ceramic substrate and thereafter taken through a firing cycle at a temperature in the range hereinbefore set forth which first burns off the organic vehicle and thereafter melts the glass frit. On cooling, the product is a distribution of metal pigment in a glassy matrix which possesses an electrical conductivity sufficient to produce minimal and predictable resistance in the electric circuit.

The most common commercial inks which are used in thick-film circuitry, as hereinbefore set forth, are based on the noble metals. However, due to the volatility of the prices of these noble metals as well as the availability thereof, there is a strong incentive to replace the noble metal pigments with a nonnoble metal pigment which would result in less costly conductors. While several nonnoble metal systems are currently in use, there are certain disadvantages inherent in these systems which prevent a wide acceptance of the system. One drawback in using these nonnoble conductive metals such as nickel or copper has been that these metals are subject to a relatively ready oxidation of the metal, thereby reducing the conductivity of the metal to a point where it is insufficient in conductive properties to be useful in microcircuits. Another disadvantage is that the inks or conductive surfaces possess a poor solderability. Currently, copper-based systems do possess good electrical conductivity. However, the firing of the ink must be accomplished either in an inert atmosphere or at a low temperature such as a maximum of 700° C. To overcome this relatively low temperature firing, it has been necessary to incorporate a selective oxidatable material into the ink. U.S. Pat. No. 4,122,232 discloses a paste which is used in forming a base metal thick-film electrical conductor which comprises mixing the paste consisting of a base metal powder such as nickel, copper, cobalt or mixtures thereof with a boron powder and a vehicle and a glass frit, said vehicle comprising an organic compound of the type well known in the art. A somewhat similar conductive ink is disclosed in U.S. Pat. No. 4,322,316 which discloses a thick-film conductor paste consisting of boron, copper oxide and a glass frit as well as an inert vehicle.

Various U.S. patents have shown different inks. For example, U.S. Pat. No. 3,663,276 deals with inks which are used as resistors having a resistance greater than 100,000 ohms per square. However, this reference uses noble metals or noble metal oxides with nonnoble metals of given concentrations. The nonnoble metals oxidize upon firing, thus becoming nonconductive in nature and providing the desired high resistivity. Other U.S. patents such as U.S. Pat. Nos. 3,843,379, 3,811,906 and 3,374,110 describe utilizing a noble metal that is mixed with a vitreous frit, an organic binder, a solvent and is thereafter fired in an air atmosphere at an elevated temperature. These patents describe the use of noble metals such as gold, silver, palladium or mixtures thereof. While certain U.S. patents such as U.S. Pat. Nos. 3,647,532 and 2,993,815 describe the use of nonnoble metals as conductive inks, it is necessary that these inks utilize a furnace with an accurately controlled special type atmosphere. For example, in the former patent, the firing is effected in an essentially neutral or inert atmosphere, except that it contains sufficient oxygen and claims that the upper limit of the oxygen which is present is 0.1% by volume. Further, this reference also utilizes a reducing agent within the ink such as hydrazine hydrate which when decomposed at elevated temperatures releases hydrogen and reacts with excess oxygen, thus preventing oxidation of the base matter in the essentially neutral atmosphere. The purpose of the low oxygen content in this patent is to burn off the binder, but it cannot be any higher inasmuch as it will oxidize the conductive metal and render the ink electrically nonconductive. By utilizing this inert or essentially neutral atmosphere, the atmosphere is identical to a rare gas such as neon, argon, krypton, xenon, radon, etc. which show practically no tendency to combine with other elements. Therefore, an inert atmosphere is neither oxidizing nor reducing which is in contradistinction, as hereinafter set forth in greater detail, to the oxidizing atmosphere of the present invention. U.S. Pat. No. 2,993,815 hereinabove cited uses two firing operations. The first firing is effected in an air, oxygen or mixed oxygen and inert gas environment so as to form the glass-metal bond. Following this, the second firing is effected in a reducing atmosphere possessing a critical composition of nitrogen, hydrogen and small amounts of oxygen to reduce the oxidized metal. Nonnoble metals such as copper, nickel, alloys of nickel and copper or iron when fired in an air atmosphere at 840° C. are known to oxidize rapidly and therefore will no longer be able to be utilized as conductive metals.

It is also known that reducing agents can be added to the glass frit. However, this produces spotty conduction zones. The addition of antimony, chromium, charcoal or other oxygen scavengers can be mixed or blended into the conductive ink, but on firing reduction is nonuniform and will tend to occur only where the oxygen scavenger is present. U.S. Pat. No. 3,711,428 describes the mixing of charcoal with the ink. However, this action is taken to prevent blistering or cratering of the resistor, the charcoal burning off and thus leaving the metal exposed for oxidation. While this does not cause problems for the noble metal, there is substantial oxidation of nonnoble metals such as copper. Another U.S. patent, namely U.S. Pat. No. 2,795,680, utilizes a ceramic base to which is bonded a cross-linked epoxy resin and a conductive and nonconductive powder. The resin is cross-linked at 250° C. which is well below the firing temperature which is utilized in the present invention. In the event that resistors need to be cofired, the conductor ink could not withstand the higher temperature.

In addition to the aforementioned references, U.S. Pat. No. 4,079,156 describes a conductive metal pigment which is prepared by alloying a nonnoble conductive metal with an oxidizable material followed by mixing the resulting alloy with a vitreous frit and an organic vehicle to form an ink. The ink is then screened onto a substrate followed by firing said ink in an oxidizing atmosphere containing at least 20% by volume of oxidation in a temperature in excess of about 500° C. The firing is effected for a period of time which is sufficient to utilize the oxidizable material without oxidation of the nonnoble metal. The oxidizable material is present in the alloy in an amount within the range of from about 0.1 to about 10% by weight of the alloy. The resulting ink or conductive pigment will hereinafter be used in the preparation of a thick-film device, the conductivity of the conductive metal portion of the pigment being retained in an amount sufficient to permit the conductive pigment to be used in microcircuitry.

U.S. Pat. No. 3,943,168 discloses conductor compositions comprising nickel borides in which the compositions are finely divided inorganic powders comprising one or more compounds of nickel such as a mixture of nickel boride and nickel boride-silicide. It is also stated in this patent that the compositions may contain nickel metal powder in which the nickel powder may comprise up to 8% of the total weight of the nickel and nickel compounds present. Likewise, U.S. Pat. No. 4,130,854 discloses a borate-treated nickel pigment for metalizing ceramic, the borate coating forming a glass on the surface of the nickel powder, the borate forming an oxidation-resistant film which aids in the adhesion of the nickel to the substrate.

Another U.S. patent, namely U.S. Pat. No. 3,671,291, discloses a method for preparing an alloy which comprises placing a metal salt and boric acid into a bath and thereafter inserting a substrate into the bath to produce a very thin conductive film. However, this technique could not be utilized for the thick film conductive surface of the present invention inasmuch as specific patterns of conductors could not be applied, the deposition rate utilizing this technique would be much lower and therefore would require a relatively long preparation time. Furthermore, such thin films would be very difficult to solder. U.S. Pat. No. 3,391,010 is very similar in nature to this U.S. patent and the same disadvantages would also apply thereto. U.S. Pat. No. 3,181,981 discloses a method for making a semiconductor device. The alloy sheet described in this patent must be diffusion bonded to the substrate. This step would be very difficult to accomplish in a thick film application inasmuch as the substrate is usually a high temperature ceramic. The need to deform the foil restricts the boron content of the alloy to low values, and will also decrease the oxidation resistance, thus making it unapplicable for thick film ink applications. Bonding, if possible, must be performed in an inert atmosphere. Likewise, the ink would be difficult to solder. U.S. Pat. No. 3,872,360 is drawn to capacitors with nickel-containing electrodes produced from a nickel alloy or a physical mixture of a nickel alloy plus a noble metal. However, the problem of solderability does not enter into this inasmuch as the nonnoble portion of the system is not solderable.

U.S. Pat. No. 3,843,350 physically mixes a platinum/copper alloy with at least 50% silver to form a conductor. The examples show that the solderability of the mixture drops from excellent to good when the copper content of the alloy increases, thus a base metal above about 25% would not be expected to be solderable. Another U.S. patent which discloses an alloy is U.S. Pat. No. 4,081,710. However, this patent is drawn to a very high temperature igniter or sparking device, particularly for gas turbine engines and was never intended to pertain to solder bond inasmuch as solder would melt well below the operating temperature described therein.

Another disadvantage which is inherent in nonnoble metal-based thick-film conductor inks is a difficulty in soldering the inks to surfaces to form the desired circuits. Inasmuch as noble-based inks are relatively expensive and thus add to the overall cost of the finished product, a present need exists for a moderately priced conductor ink which is readily solderable in a relatively simple manner utilizing conventional methods.

As will hereinafter be shown in greater detail, we have now discovered that a conductive and solderable pigment-coated thick film surface which possesses excellent solderability and conductive characteristics may be prepared according to the method herein set forth. It was totally unexpected that an alloy powder for conductor applications having a non-noble metal content up to 75% in conjunction with a noble metal would possess excellent solderable characteristics, especially in view of prior patents which indicated that an alloy containing greater than 25% of nonnoble metal would possess poor solderable characteristics.

BRIEF SUMMARY OF THE INVENTION

This invention relates to novel conductive metal pigment surfaces and to a process for the preparation thereof. More specifically, the invention is concerned with novel conductive metal pigments which are prepared by forming an alloy of a nonnoble conductive metal and at least one oxidizable material, admixing this nonnoble conductive alloy with a noble metal, adding the admixture to an organic vehicle followed by firing the mixture in an air atmosphere at a temperature in excess of about 500° C. whereby the oxidation of said oxidizable material is effected without oxidation of the nonnoble and noble conductive metals, and thus affords a conductive metal pigment which is readily solderable.

As hereinbefore set forth, in view of the relatively expensive costs of noble metals such as gold, platinum, palladium, silver, etc., it is an economical advantage for the manufacturers of conductive inks to utilize nonnoble metals as a major component when preparing conductive pigments for use in thick-film devices. However, the nonnoble metals must be able to withstand the oxidizing environment of the firing operation. The mixture of the conductive metal and organic vehicle, when silk-screened onto the substrate and taken through a firing cycle, will burn off the organic vehicle. The oxide that is formed from the oxidizable material may also flow and aid the bonding of the particles. Therefore, with this alloy the vitreous frit is not always necessary. However, it is also contemplated within the scope of this invention that the conductive pigment may also contain a vitreous frit. Thus, when using ceramic substrates on which the conductive pigment is combined, the vitreous frit, which may be in the form of glass, can assist to both bind the metal particles which form the conductive portion of the pigment together and, in addition, will also act to bind the particles to the substrate. It is therefore necessary to fire the combination at such a temperature so that the glass will flow and also for particle sintering to occur and thus act in a manner to which it is intended.

The conductive pigment which is prepared according to the process of this invention will possess desirable physical characteristics and properties which are greater than those found in conductive metal pigments which have been prepared according to methods set forth in other references. The pigments which are prepared according to the process of this invention will possess the desirable characteristics of improved solderability over other conductive pigments containing only a nonnoble metal as the conductive element in the ink. The conductive pigments of the present invention will possess other desirable characteristics such as an increased resistance to oxidation as well as an increased fired strength, the increase in resistance to oxidation is particularly beneficial inasmuch as it is necessary for the conductive metal pigment such as an ink to withstand multiple or longer term firings without a subsequent degradation. Another advantage which is inherent in the increased resistance to oxidation is that it also improves solderability inasmuch as this would be effected by an oxidized layer on the surface of the conductor. Likewise, the increase in firing strength would also afford an advantage inasmuch as the higher strength is necessary for the durability of an electrical circuit utilizing such an ink both in handling and in service. This is particularly applicable inasmuch as many of the connections would be of the clip contact type, a strong conductor being required in order to withstand the clip pressure without flaking.

By combining a nonnoble conductive metal with an oxidizable material and a minor portion of a noble metal, it is possible to afford other advantageous properties to the conductive pigment such as the physical strength of the ink as measured by adhesion measurements as well as a reduction in the conductivity of the resulting pigment.

It is therefore an object of this invention to provide a conductive metal pigment comprising an alloy consisting of a nonnoble metal and an oxidizable material in admixture with a minor portion of a noble metal.

In one aspect an embodiment of this invention resides in a process for the preparation of a conductive and solderable pigment-coated thick film surface comprising an alloy of a nonnoble conductive metal, at least one oxidizable material and a noble metal composited on an inert surface which comprises the steps of: admixing a nonnoble metal, an oxidizable material selected from the group consisting of carbon, boron, silicon, aluminum and combinations thereof and a noble metal to provide a resultant admixture; arc-melting said admixture in an inert atmosphere to form an alloy of said components; grinding said arc-melted alloy to a powdered form; admixing said powder with a carrier binder; depositing said admixture on an inert surface; firing said admixture and surface in an oxygen-containing atmosphere at a temperature in the range of from about 500° to about 950° C.; fluxing the resultant conductive pigment-coated surface with a zinc chloride-based flux to provide a solderable conductive pigment-coated surface and recovering said surface.

A further embodiment of this invention resides in a conductive and solderable pigment-coated thick film surface comprising an alloy of a nonnoble metal, at least one oxidizable material and a noble metal composited on an inert surface which is prepared by the steps of: admixing a nonnoble metal, an oxidizable material selected from the group consisting of carbon, boron, silicon, aluminum and combinations thereof and a noble metal to provide a resultant admixture; arc-melting said admixture in an inert atmosphere to form an alloy of said components; grinding said arc-melted alloy to a powdered form; admixing said powder with a carrier binder; depositing said admixture on an inert surface; firing said admixture and surface in an oxygen-containing atmosphere at a temperature in the range of from about 500° to about 950° C.; fluxing the resultant conductive pigment-coated surface with a zinc chloride-based flux to provide a solderable conductive pigment-coated surface, and recovering said surface.

A specific embodiment of this invention is found in a process for the preparation of a conductive and solderable pigment-coated thick film surface comprising an alloy of copper, boron and silver composited on alumina which comprises the steps of admixing copper, silver and boron, arc-melting the resultant admixture in an inert atmosphere to form an alloy thereof, grinding said arc-melted alloy to a powdered form, admixing said powder with a carrier binder, depositing said admixture on an inert surface comprising alumina, firing said mixture and surface in an oxygen-containing atmosphere at a temperature of about 900° C., fluxing the resultant pigment-coated surface with a zinc chloride based flux to provide a solderable conductive pigment-coated surface and recovering said surface.

Another specific embodiment of this invention resides in a conductive and solderable pigment-coated thick film surface comprising an alloy of copper, boron and silver composited on alumina, said surface being prepared by the steps of: admixing copper, boron and silver to form an admixture, said copper being present in an amount in the range of from about 60% to about 94% by weight of said admixture, said boron being present in an amount in the range of from about 5% to about 25% by weight of said admixture, silver being present in an amount in the range of from about 1% to about 15% by weight of said admixture; arc-melting said admixture in an inert atmosphere to form an alloy of said components; grinding said alloy to a powdered form; admixing said powder with a carrier binder; depositing said powder and binder on alumina; firing said admixture and alumina in an oxygen-containing atmosphere at a temperature of about 900° C.; fluxing the resultant conductive pigment-coated surface with a zinc chloride based flux to provide a solderable conductive pigment-coated surface and recovering said surface.

Other objects and embodiments will be found in the following further detailed description of the present invention.

DETAILED DESCRIPTION OF THE INVENTION

As hereinbefore set forth, the present invention is concerned with conductive thick film pigment-coated surfaces comprising a mixture of an alloy consisting of a nonnoble metal with an oxidizable material in admixture with a noble metal, the resultant surface possessing excellent characteristics with regard to conductivity and solderability. As will hereinafter be shown in greater detail, alloys which comprise a nonnoble metal and an oxidizable material do not possess good solderability characteristics and are difficult, if not impossible, in many instances, to solder. It has now been discovered that by preparing a conductive metal pigment containing as three components thereof a major portion of a nonnoble metal, an oxidizable material and a minor portion of a noble metal which has been subjected to a zinc chloride base flux, it is possible to obtain a conductive thick film pigment-coated surface which possesses excellent solderability characteristics. In addition to these solderability characteristics, the conductive pigment-coated surface will also possess a conductivity which may be established within desired ranges. Inasmuch as the conductive materials of the nonnoble metal type which are usually utilized in circuits are readily oxidized when heated in air, and that the aforesaid method of preparing conductive pigments for use in devices of the thick-film type were effected by firing a combination of a conductive metal and a vehicle, it was unexpected that such a pigment could be prepared in the usual manner when utilizing a nonnable metal such as nickel or copper as a conductive element without the aforesaid oxidation of the conductive metal. A nickel powder admixed with carbon powder does not possess relatively good conductivity. However, if a nickel-carbon alloy is prepared in a proper manner, it has been found that the oxidation of carbon in the alloy is slower than if the carbon in the form of charcoal is mixed in with the nickel, probably due to the fact that in the alloy the carbon must diffuse through the lattice to the surface. An alloy which is correctly formed will prevent localized oxidation and will not leaave sections of the fired ink either nonconductive or highly resistive. It is therefore necessary to form an alloy which is composed of two or more metals or elements, one of which comprises the nonnoble conductive metal while the other comprises an oxidizable material which is preferentially oxidized. By using such a preferentially oxidized material which includes, but is not limited to, carbon, boron, silicon, aluminum, etc., or combinations of these metals such as carbon-silicon, boron-silicon, etc., it is possible to obtain the desired result. Thus, for example, a more mobile alloying element such as boron, carbon, or silicon can diffuse through the crystal lattice at an elevated temperature, being preferentially oxidized and thus prevents oxidation of the conductive nonnoble metal. One of the benefits which is attained by practicing the present invention is that the presence of a vitreous frit or glass is not necessary inasmuch as the nonnoble metal alloy forms its own glass when reacting with the oxide. By eliminating the presence of a vitreous frit or glass, the addition of a high temperature binder becomes completely unnecessary in the preparation of a conductive pigment. In addition, another benefit which may be ascribed to the conductive pigment is that it may be utilized to produce uniformly thick films.

The alloys which comprise one portion of the conductive pigment may be prepared in any manner known in the art. For example, one method of preparing the alloy is to prepare a molten solution of the nonnoble conductive metal such as nickel or copper and the oxidizable material such as carbon, silicon, boron, aluminum, combinations of boron and silicon, boron and aluminum, boron and carbon, etc., following which the solution may be spray atomized to form spherical particles of the alloy. In this method, the material which is preferentially oxidized can be alloyed in the nonnoble conductive metal as a second phase, such as boron in nickel or copper and/or dissolved in the metal as a single phase.

In the preferred embodiment of the invention, the ratio of oxidizable material is present in the alloy in an amount in the range of from about 5% to about 20% by weight of the alloy, although it is also contemplated within the scope of this invention that the amount of oxidizable material may range up to about 25% by weight, the resulting alloy not necessarily giving equivalent results. The remainder of the alloy, that is, the nonnoble conductive metal, will be present in the alloy in a range of from about 95% to about 75% by weight of the alloy.

The resulting alloy may then be admixed with a noble metal such as silver, gold, platinum, palladium, as well as iridium, rhodium, ruthenium and osmium, said metals usually being in elemental form following which the admixture may be arc-melted to form an ingot which is thereafter ground to the desired particle size.

Alternatively, the conductive pigment of the present invention may also be prepared by admixing the nonnoble metal, the oxidizable material and the noble metal in the desired proportions, the components of the mixture usually being present in powdered elemental form and after thoroughly admixing the components, subjecting the mixture to a press. The mixture is then arc-melted in inert atmospheric conditions to produce the desired conductive pigment. While the nonnoble metal and oxidizable material are present in amounts hereinbefore set forth, it is contemplated that the noble metal will be present in a minor portion, that is, from about 1% to about 15% by weight of the alloy.

The desired conductive pigment-coated surface may be prepared by admixing the three-component alloy with an organic vehicle which, if so desired, may contain an organic binder to form an ink. Inasmuch as the preferentially oxidizable material will form its own glass, and one purpose of the glass is to bind the conductive pigment to a substrate of the type hereinafter set forth in greater detail, the presence of a vitreous frit will not be required in the formation of the ink. After screening said ink onto a substrate such as a ceramic which may be formed of alumina, silica-alumina, or ceramic-coated metal such as enameled steel, etc., the alloy is fired in an oxidizing atmosphere which is formed by the presence of an oxygen-containing gas such as air, oxygen, etc. The air firing operation which is effected at temperatures in excess of about 500° C. accomplishes two important functions. The first function is that the base of nonnoble conductive metals such as copper and the noble metal such as silver are not oxidized in the highly oxidizing atmosphere so that it remains highly and uniformly conductive, while the second function of the firing operation is that the preferentially oxidizable material reacts to form the glass which fuses the particles together and to the substrate, thus acting as a barrier which will reduce the diffusion of oxygen into the nonnoble and noble metal. The term "air atmosphere" as used in the present specification will refer to an atmosphere consisting of nitrogen, oxygen, carbon dioxide, etc. The components of this air atmosphere, exclusive of water vapor, as stated in the CRC HANDBOOK OF CHEMISTRY AND PHYSICS consist of approximately 20.9% by volume of oxygen, 78.0% by volume of nitrogen, 0.33% by volume of carbon dioxide and 0.93% by volume of argon. Therefore, the oxidizing atmosphere in which the ink is fired will contain a lower limit of approximately 20% by volume of oxygen and may, if so desired, consist of 100% by volume when utilizing pure oxygen. After firing the alloy in this oxidizing atmosphere for a period of time which is sufficient to oxidize the preferentially oxidizable material without oxidation of the nonnoble and noble conductive metals, the thus fired product is cooled and recovered.

In another embodiment, the vehicle which is utilized as one component of the conductive ink will usually comprise an organic binder with an organic solvent which is utilized to reduce or to obtain the proper viscosity of the mixture in order to silk-screen the conductive ink onto the desired substrate. For example, the vehicle may be a mixture of resin binder such as ethyl cellulose while the organic solvent may comprise a low-cost organic material such as pine oil. The substrate can be a ceramic such as alumina, silica-alumina, etc. The conductive ink consisting of a mixture of the conductive pigment, the metal or oxide addition and the vehicle may comprise from about 75% to 95% of the conductive pigment and addition and from about 5% to about 25% organic vehicle. A vitreous frit content of 0.1% to 20% may also be included where specific properties of the fired ink may be modified. The frit may comprise a mixture of silica, alumina, calcia, lead oxide, sodium oxide and boron oxide in varying concentrations.

The resulting composite is then fired at a temperature above about 500° C., the dissolved preferentially oxidizable material will then diffuse to the surfaces of the nonnoble and noble metals and will therefore be readily available for preferential oxidation.

By utilizing an alloy of the type hereinbefore set forth in admixture with a noble metal of the type hereinbefore set forth, it would be possible to air-fire a conductive ink containing this admixture as well as an organic vehicle which acts as a solvent plus a low temperature organic binder such as pine resin, ethyl cellulose, etc. and, if so desired, a high temperature binder such as a vitreous frit or glass on a substrate in an oxidizing atmosphere and temperatures in excess of about 500° C. and preferably in a range of from about 650° C. to about 950° C. or more to produce a conductive pigment in which the nonnoble and noble conductive metals retain the desired conductive characteristics without imparting a deleterious effect on the conductive properties of the metals. The use of this type of firing technique ensures that the base conductive metal is not oxidized to such a state whereby it will not be highly and uniformly conductive, but will possess an increased resistance to oxidation, will also possess an increase in fired strength and will maintain an excellent adhesion to the substrate. In addition, it is possible to avoid the necessity for firing the conductive pigment in an essentially neutral atmosphere which is neither oxidizing or reducing in nature and which would possibly require the presence of a reducing compound in order to prevent any oxidation, thereby contributing to an increase in the overall cost or expense of producing such a conductive pigment.

The conductive pigments of the present invention may be prepared, preferably in a batch type operation, by grinding the nonnoble conductive metal and the preferentially oxidizable material to particles which may range in size from about 0.1 to about 100 micrometers in diameter, admixing the particles and thereater hydrostatically pressing the mix to form a compact mass. If so desired, the mass may then be arc melted and splat quenched to improve the homogeneity of the alloy. The alloy is then ground to a powder and admixed with the noble metal of the type hereinbefore set forth in greater detail which is also in the form of a powder. Sizes of both of these powders may range from 0.1 to 25 micrometers in diameter. Conversely, the nonnoble metal, noble metal and oxidizable material may all be ground to the desired particle size, admixed in powdered form, the metals being present in the elemental state. The three components may then be hydrostatically pressed, arc melted, quenched and reduced into powder of the desired particle size.

Following this, if so desired, a glass frit may be mixed with the powder prior to the addition of the vehicle. However, the presence of the frit is not necessary and, if so desired, the admixture of the alloy and the metal or metal oxide may be added directly to the low temperature organic binder. This binder may comprise a carrier such as Terpineol mixed with a solvent such as ethyl cellulose and a viscosity modifier.

The thus-formed ink may then be painted on the surface of a carrier or substrate such as a ceramic which may be formed of an alumina, silica-alumina or ceramic-coated metal such as enameled steel, etc. The binding of the ink on the substrate is accomplished so that the desired thickness and width of the finished ink may be within the parameters which have been determined prior to the painting step of the process. Following the screening or painting of the ink on the substrate, the volatiles which are present in the binder may be removed by heating the painted substrate at an elevated temperature sufficient to volatilize the undesired compounds. Thereafter, the alloy is fired in an oxidizing atmosphere which is formed by the presence of an oxygen-containing gas such as air, oxygen, etc., in an appropriate apparatus such as a belt furnace, etc. The air firing operation which is effected at temperatures in excess of about 500° C. and up to about 950° C. accomplishes two important functions. The first function is that the base of nonnoble and noble conductive metals such as copper and silver are not oxidized in the highly oxidizing atmosphere so that they remain highly and uniformly conductive, while the second function of the firing operation is that the preferentially oxidizable material reacts with the admixed metals to form the glass which fuses the particles together and to the substrate, thus acting as a barrier which will reduce the diffusion of oxygen into the nonnoble and noble metals.

The alloy on the surface, after having been fired at the above temperature, is then subjected to the action of a flux. As will hereinafter be shown in greater detail, by utilizing a zinc chloride-based flux, it is possible to attain a pigment-coated surface which possesses excellent solderability characteristics. This is in contrast to the use of other fluxes such as those which are rosin-based.

By utilizing an alloy of the present process comprising a mixture of a nonnoble metal, oxidizable material and noble metal, it is possible to solder directly to the ink and thus eliminate additional steps which are required to be effected before soldering other inks which do not contain all of the components of the present invention. For example, it is very difficult to solder inks prepared from nonnoble metals and therefore it may be necessary to paint or screen a noble metal-based ink on top of the nonnoble metal ink in areas which are to be soldered, prior to the firing of the said ink. Alternatively, an additional step which may be required is to add another metal on top of the nonnoble metal ink by electroplating or electroless plating subsequent to the firing operation. In addition, another step which may be required in the event that a painting operation or plating operation is not employed is to treat the ink with an activating agent followed by a rinse of the agent from the surface of the ink before the soldering operation can be effected. By utilizing the ink of the present invention, the additional steps are eliminated, thus lowering the overall cost of the operation.

The conductive thick film pigment-coated surfaces may be soldered to appropriate substrates in any manner known in the art. For example, the alloy of the nonnoble metal, oxidizable material and noble metal may be soldered before firing of the alloy utilizing a flux or, in the alternative, the alloy may be soldered while on the substrate after firing of the alloy at a temperature and for a time period within the ranges hereinbefore set forth, utilizing an appropriate flux.

The substrate is dipped in a bath of the flux following which the substrate containing the conductive pigment surface is then dipped in a molten solder bath. Following this, the excess flux such as a zinc chloride-based flux is rinsed by dipping the substrate in water, the solder adhering only to the conductive thick film pigment-coated surface.

The following examples are given to illustrate the conductive pigment-coated surfaces of the present invention and the ability of said surfaces to present a solderable characteristic to predetermined substrates. However, it is to be understood that these examples are given merely for purposes of illustration and that the present process is not necessarily limited thereto.

EXAMPLE I

A conductive pigment-coated surface was prepared by mixing particles of nickel and boron having a size ranging from 0.1 to 100 micrometers followed by hydrostatically pressing the mix to 30,000 psi to form a compact mass. The mass was then arc-melted to form an alloy of nickel and boron. Following this, the alloy of nickel and boron, in which the boron was present in the alloy in an amount of 5% by weight of the alloy, was ground into a powder using a wiggle bug type grinder. The alloy was then mixed with 10% glass frit and further mixed with a low temperature organic binder which was prepared by combining 95% by weight of Terpineol with 4.5% by weight of ethyl cellulose and 0.5% by weight of a viscosity modifier comprising stabilite, the completed ink containing 10% by weight of the carrier/binder.

The resulting ink composited was then painted on a selected substrate, the ink being generally 0.04" to 0.09" in width and from about 0.004" to about 0.008" in thickness, the painting of the ink on the ceramic being accomplished using hand painting techniques. Precision screening techniques are desired for most other applications. After painting the ink on the substrate, the volatiles in the carrier/binder were removed by heating the circuits to a temperature of approximately 100° C. for a period of 15 minutes. The circuits were then placed in an open end tube furnace and fired by subjecting the circuits to a temperature profile, the inks being maintained at a peak temperature of 900° C. for a period of 10 minutes. After cooling the ink-coated substrate, the substrate was fluxed using both a rosin-based flux and a more aggressive zinc chloride-based flux.

An attempt to solder the fluxed substrate was made using conventional soldering techniques. However, the bead of solder comprising 50% tin and 50% lead did not adhere to the painted stripe of ink.

EXAMPLE II

In this example, an alloy was formed in which elemental powders of nickel, boron and silver in a weight ratio of 92:5:3 were thoroughly admixed. Following the admixture, the alloy was arc-melted to form an ingot. The ingot, after cooling was ground into a powder, again using a wiggle bug type grinder. One portion of the dry powder was further mixed with a low temperature organic binder similar in nature to that employed above, the completed ink containing 10% by weight of the carrier/binder. A second portion of the powder was admixed with 10% by weight of glass frit prior to admixture with the organic binder. The two inks were then painted on a ceramic substrate using precision screening techniques in stripes having dimensions similar to that set forth in the example above, that is, widths varying from 0.04" to 0.09" and thicknesses varying from 0.004" to 0.008". The ink which did not contain the glass frit was fired in an open end tube furnace at varying temperatures, the peak temperature being 900° C., and a residence time of 10 minutes. The ink which contained the glass frit was also fired in a similar manner, the exception being that the peak temperature of 900° C. was maintained for a period of two minutes. After cooling, the samples were fluxed using both a rosin-based flux and a zinc chloride-based flux. The ink which was fluxed with a rosin base was difficult to solder, only a small portion of the solder adhering thereto. However, the samples which had been subjected to the zinc chloride-based flux showed excellent soldering characteristics, the soldering bead adhering firmly to the conductive ink surface.

EXAMPLE III

Conductive inks which may be prepared from alloys comprising admixtures of gold, copper and boron; platinum, nickel and carbon; palladium, copper and boron; aluminum, silver and boron-carbide when arc-melted, ground and admixed with a carrier of the type hereinbefore set forth may also exhibit excellent solderable characteristics after being painted on a substrate and fired to form a circuit.

We claim as our invention:

1. A process for the preparation of a conductive and solderable pigment-coated thick film surface comprising an alloy of a nonnoble conductive metal, at least one oxidizable material and a noble metal composited on an inert surface which comprises the steps of:
   (a) admixing nickel or copper in an amount of from about 60% to about 94% by weight of said alloy, an oxidizable material selected from the group consisting of carbon, boron, silicon, aluminum and combinations thereof in an amount in the range of from about 5% to about 25% by weight of said alloy and a noble metal in an amount in the range of from about 1% to about 15% by weight of said alloy to provide a resultant admixture;
   (b) arc-melting said admixture formed in step (a) in an inert atmosphere to form an alloy of said components;
   (c) grinding said arc-melted alloy of step (b) to a powdered form;
   (d) admixing said powder of step (c) with a carrier binder;
   (e) depositing said admixture of step (d) on an inert surface;
   (f) firing said admixture and surface of step (e) in an oxygen-containing atmosphere at a temperature in the range of from about 500° to about 950° C.;
   (g) fluxing the resultant conductive pigment-coated surface with a zinc chloride based flux to provide a solderable conductive pigment-coated surface and recovering said surface.

2. The process as set forth in claim 1 in which said nonnoble metal is nickel.

3. The process as set forth in claim 1 in which said nonnoble metal is copper.

4. The process as set forth in claim 1 in which said noble metal is silver.

5. The process as set forth in claim 1 in which said noble metal is gold.

6. The process as set forth in claim 1 in which said noble metal is palladium.

7. A conductive and solderable pigment-coated thick film surface prepared by the process of claim 1.

* * * * *